A. A. LONGAKER.
WHEEL MOUNTING OR DEMOUNTING PRESS.
APPLICATION FILED JULY 1, 1913.
1,091,457.
Patented Mar. 24, 1914.
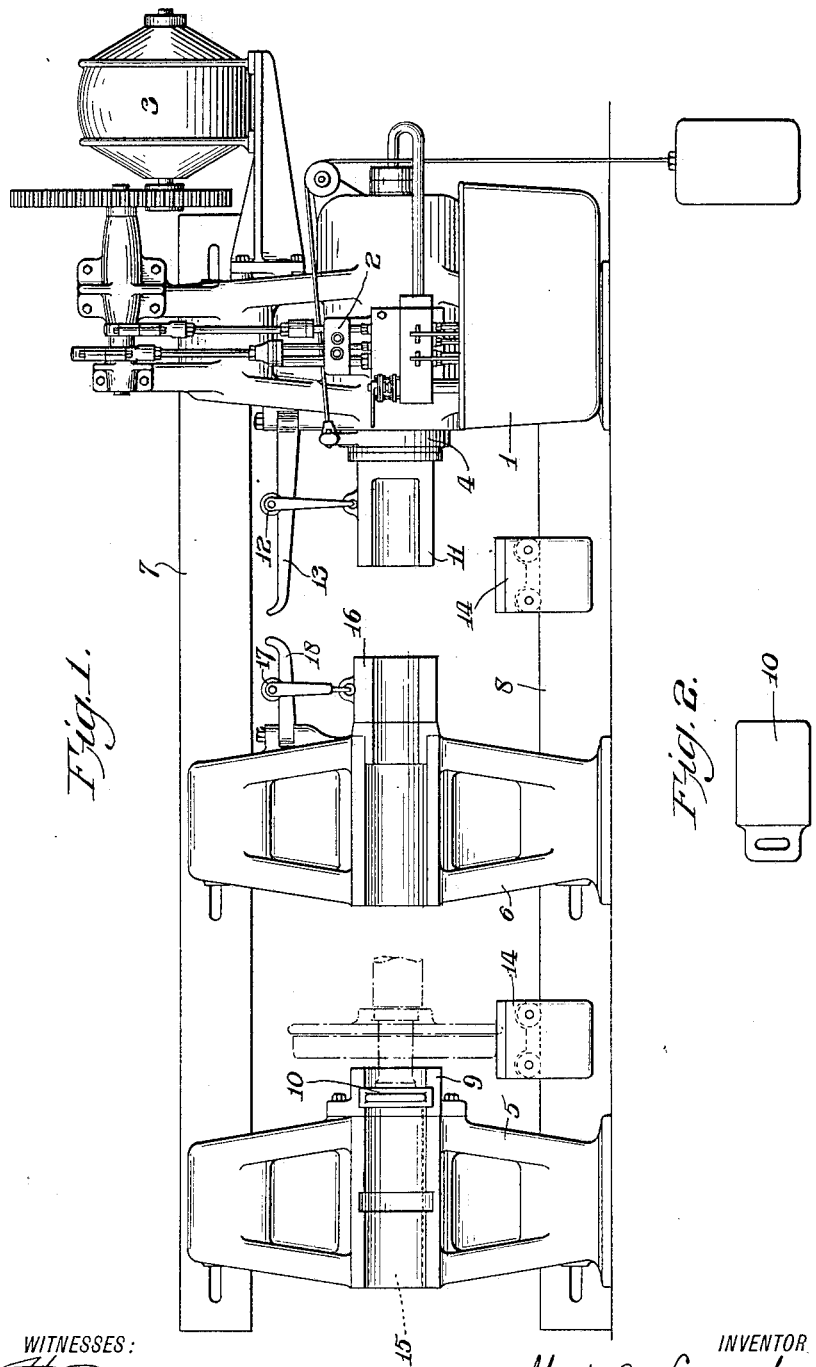

UNITED STATES PATENT OFFICE.

ALBERT A. LONGAKER, OF CHAMBERSBURG, PENNSYLVANIA, ASSIGNOR TO CHAMBERSBURG ENGINEERING COMPANY, OF CHAMBERSBURG, PENNSYLVANIA, A CORPORATION OF PENNSYLVANIA.

WHEEL MOUNTING OR DEMOUNTING PRESS.

1,091,457.

Specification of Letters Patent.  Patented Mar. 24, 1914.

Application filed July 1, 1913. Serial No. 776,850.

*To all whom it may concern:*

Be it known that I, ALBERT A. LONGAKER, a citizen of the United States, and a resident of Chambersburg, in the county of Franklin and State of Pennsylvania, have invented certain new and useful Improvements in Wheel Mounting or Demounting Presses, of which the following is a specification.

My invention relates to improvements in that class of press for mounting or demounting wheels and axles which consist of a cylinder beam furnished with proper hydraulically operated means for exerting a heavy pressure and two resistance beams which hold the wheels or axle against said pressure while one or the other is being operated upon, and the object of my invention is to furnish a press for this double purpose all of the beams of which will be permanently fixed and in which the necessary adjustments for performing either one of these operations will be made by means of comparatively small and light movable parts which can be easily and rapidly handled.

My invention comprises the usual cylinder beam with its ram and means for generating and conducting to and from the ram cylinder a fluid under pressure, a fixed end resistance beam which is equipped with a fixed stop for engaging the left hand side of the hub of the left hand wheel when this wheel is being forced to its seat upon the axle, with a movable stop for engaging the left hand end of the axle when the right hand wheel is being forced upon its seat, and of a stationary center resistance beam which is used when wheels are being demounted from the axle.

My invention comprises further a movable distance piece which is used in connection with the center beam in demounting wheels and of a movable sleeve which is used in connection with the ram in mounting wheels.

My invention is illustrated in the accompanying drawings forming part of this specification and in which—

Figure 1, is a side elevation of my wheel and axle mounting and demounting press: Fig. 2, a side elevation of stop for closing the opening in the end resistance beam.

1 is the cylinder beam which is of the usual construction. 2 is the pump, 3 a pump driving means, 4 the ram. The construction and operation of all of these parts is well known and will not need detailed description.

5 is the end resistance beam, 6 the center resistance beam. All of these beams are fixed and tied together in any suitable manner, by rods or bars 7—8 for instance.

The end resistance beam 5 is furnished with a fixed stop 9 and with a removable stop 10 which closes an opening in the stop 9 and beam 5. 11 is a sleeve, open on one side as shown in the side view Fig. 1 which is carried by a trolley 12 running on a jib crane 13 which is pivotally carried by the beam 1. The inner end of the sleeve being in engagement with the outer end of ram 4 and an axle carrying wheels to be seated thereon being run upon the trucks 14, which are of the usual construction, and the stop 10 closing the opening 15 in the beam 5, the ram 4 is advanced and moves the sleeve 4 until its outer end engages the hub of the right hand wheel. This sleeve pushes the axle and its wheels to the left until the left hand end of axle engages stop 10 which prevents any further movement of the axle. As the ram continues to advance the sleeve this latter pushes the right hand wheel upon its seat upon the axle. The right hand wheel having been mounted the stop 10 is removed from opening 15 and the ram 4 is further advanced and pushes the left hand end of axle through the left hand wheel until this latter is brought to a proper seat upon the former. During this latter operation the left hand end of the hub of the left hand wheel bears against the stop 9 carried by beam 5.

To demount wheels the sleeve 11 is swung out of the way and the distance piece 16, which is carried by a trolley 17 on a swinging jib crane 18 pivoted to center resistance beam 6, is swung into engagement with the right hand side of the beam 6. The left side of the hub of the right hand wheel is brought into engagement with the right side of the distance piece 16 and the ram 4 is advanced, engaging the right hand end of the axle and pushing this axle through the wheel until the latter is demounted. The axle is now turned end for end and the other wheel is similarly demounted.

In Fig. 1, I have shown both the distance piece 16 and the sleeve 11 in alinement with each other and the ram 4. I have done this to save unnecessarily increasing the sheets of drawings of this application. It will be understood that usually when the sleeve 11 is moved into alinement with the ram 4 that the distance piece 16 is swung back out of contact with resistance beam 6 and vice versa.

Having thus described my invention I claim as new and desire to secure by Letters Patent:—

A wheel press comprising, in combination, two fixed end beams one of which is furnished with a perforation to receive the end of an axle and the other of which carries a ram, said ram and means for operating the same, a fixed beam intermediate of said end beams, and a removable distance piece adapted to abut said center beam on the side adjacent said ram to engage and hold a wheel from moving while said ram pushes the axle from its seat in said wheel.

ALBERT A. LONGAKER.

Witnesses:
GEO. H. DERBYSHIRE,
LILLIAN M. WOLF.

Copies of this patent may be obtained for five cents each, by addressing the "Commissioner of Patents, Washington, D. C."